United States Patent
Choi et al.

(10) Patent No.: US 10,295,362 B2
(45) Date of Patent: May 21, 2019

(54) SYSTEM AND METHOD FOR ESTIMATING AVAILABLE DRIVING DISTANCE OF ELECTRIC VEHICLE

(71) Applicants: Hyundai Motor Company, Seoul (KR); IUCF-HYU (Industry-University Cooperation Foundation Hanyang University), Seoul (KR)

(72) Inventors: Kwon Hyoung Choi, Gyeonggi-do (KR); Jin Hyung Lee, Seoul (KR); Jong Chan Jun, Seoul (KR); Jahng Hyon Park, Seoul (KR)

(73) Assignees: Hyundai Motor Company, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 0 days.

(21) Appl. No.: 15/360,086

(22) Filed: Nov. 23, 2016

(65) Prior Publication Data

US 2018/0066958 A1 Mar. 8, 2018

(30) Foreign Application Priority Data

Sep. 6, 2016 (KR) .................. 10-2016-0114608

(51) Int. Cl.
*G01C 21/36* (2006.01)
*G07C 5/00* (2006.01)
(Continued)

(52) U.S. Cl.
CPC .......... *G01C 21/3697* (2013.01); *B60L 50/50* (2019.02); *G01C 21/3469* (2013.01);
(Continued)

(58) Field of Classification Search
None
See application file for complete search history.

(56) References Cited

U.S. PATENT DOCUMENTS

| 2013/0151046 A1* | 6/2013 | Choi | G08G 1/096827 |
| | | | 701/22 |
| 2014/0107912 A1* | 4/2014 | Yucel | G07C 5/085 |
| | | | 701/123 |
| 2014/0350763 A1 | 11/2014 | Granato et al. | |

FOREIGN PATENT DOCUMENTS

| JP | 2006-115623 A | 4/2006 |
| JP | 2011-172407 A | 9/2011 |

(Continued)

*Primary Examiner* — Abby Y Lin
*Assistant Examiner* — Kyung J Kim
(74) *Attorney, Agent, or Firm* — Mintz Levin Cohn Ferris Glovsky and Popeo, P.C.; Peter F. Corless

(57) ABSTRACT

A system and method of estimating an available driving distance of an electric vehicle are provided. The method includes dividing a road into sections and receiving driving information from a vehicle traveling through each of the sections. Fuel efficiency data of the corresponding section is generated and vehicle condition information, and departure point and destination information is received from the target vehicle. Additionally, the method includes receiving real time meteorological information and road traffic situation information for each of the sections and reflecting the vehicle condition information of the target vehicle, the meteorological information and the road traffic situation information in the fuel efficiency data generated for each of the sections of the road from the departure point toward the destination. Estimated fuel efficiency and an estimated available driving distance of the target vehicle are then determined to be provided to vehicle driver.

14 Claims, 5 Drawing Sheets

(51) Int. Cl.
  *G01C 21/34* (2006.01)
  *B60L 50/50* (2019.01)
(52) U.S. Cl.
  CPC ...... *G01C 21/3492* (2013.01); *B60L 2240/12* (2013.01); *B60L 2240/622* (2013.01); *B60L 2240/642* (2013.01); *B60L 2240/645* (2013.01); *B60L 2240/662* (2013.01); *B60L 2240/667* (2013.01); *B60L 2240/70* (2013.01); *B60L 2250/16* (2013.01); *B60L 2260/52* (2013.01); *B60L 2260/54* (2013.01); *G07C 5/008* (2013.01); *Y02T 10/7005* (2013.01); *Y02T 10/7291* (2013.01); *Y02T 90/16* (2013.01); *Y02T 90/162* (2013.01)

(56) References Cited

FOREIGN PATENT DOCUMENTS

| | | | |
|---|---|---|---|
| JP | 2013-075562 A | 4/2013 |
| JP | 2014-235709 A | 12/2014 |
| JP | 2015-214294 A | 12/2015 |
| KR | 10-2014-0130939 A | 11/2014 |
| KR | 10-2015-0008256 A | 1/2015 |

\* cited by examiner

SYSTEM AND METHOD FOR ESTIMATING AVAILABLE DRIVING DISTANCE OF ELECTRIC VEHICLE

CROSS REFERENCE TO RELATED APPLICATION

The present application claims priority of Korean Patent Application No. 10-2016-0114608 filed on Sep. 6, 2016, the entire contents of which is incorporated herein for all purposes by this reference.

BACKGROUND

Field of the Invention

The present invention relates to a system and method for estimating an available driving distance of an electric vehicle and a method therefor, and more particularly to a system and method for estimating an available driving distance of an electric vehicle which generates data reflecting road conditions and real driving data of electric vehicles, and is thus able to more accurately estimate and provide an available driving distance taking into account the remaining capacity of a battery of a traveling electric vehicle.

Description of the Related Art

Recently, interest in electric vehicles (EVs) as environment-friendly vehicles is increasing due to the decrease in emissions discharged from the electric vehicles. However, the available driving distance of an electric vehicle is shorter than that of a vehicle using gasoline as fuel, and the supply of charging stations for charging the batteries of the electric vehicles is insufficient. Therefore, there is a need for estimating an available driving distance of an electric vehicle while traveling.

Typically, a navigation system is used to search for a route toward a destination, and an electric vehicle is driven along a recommended route. During this process, an available driving distance may be estimated based on the remaining capacity of the battery of the vehicle. In particular, average fuel efficiency is calculated from previous n-times recorded driving data of the corresponding vehicle, and an available driving distance is estimated based on the average fuel efficiency. However, when the vehicle repetitively travels on a downhill road, the average fuel efficiency is estimated to be comparatively high. In particular, when the vehicle travels on an uphill road, actual fuel efficiency is reduced compared to the estimated fuel efficiency. Consequently, an error value with respect to the estimated data is significantly increased since the fuel efficiency is estimated only based on previous fuel efficiency data regardless of information regarding the current driving state of the vehicle. Accordingly, due to various driving environmental variables, it is difficult to accurately estimate and provide an available driving distance.

The foregoing is intended merely to aid in the understanding of the background of the present invention, and is not intended to mean that the present invention falls within the purview of the related art that is already known to those skilled in the art.

SUMMARY

Accordingly, the present invention provides a system and method for estimating an available driving distance of an electric vehicle generating data reflecting road conditions and real driving data of electric vehicles, and thus is able to more accurately estimate and provide an available driving distance taking into account the remaining capacity of a battery of an electric vehicle.

According to one aspect, a method of estimating an available driving distance of an electric vehicle may include: dividing, by a telematics server, a road into a plurality of sections, receiving driving information from an arbitrary vehicle through each of the sections, and generating fuel efficiency data of the corresponding section; transmitting vehicle condition information, and departure point and destination information from a target vehicle to the telematics server; receiving, by the telematics server, real time meteorological information and road traffic situation information for each of the sections included in the road from the departure point to the destination; and reflecting, by the telematics server, the vehicle condition information of the target vehicle, the meteorological information and the road traffic situation information in the fuel efficiency data constructed for each of the sections included in the road from the departure point to the destination, and calculating estimated fuel efficiency and an estimated available driving distance of the target vehicle.

In the generating of the fuel efficiency data, the driving information of each of the arbitrary vehicles may include a battery consumption rate at which the vehicle consumes a battery while traveling through the corresponding section, an ambient temperature when the vehicle drives through the corresponding section, a section average driving speed, information regarding whether an eco-mode is enabled, information regarding whether headlamps are turned on, and information regarding whether wipers are turned on. The vehicle condition information transmitted from the target vehicle may include a battery condition information of the target vehicle and information regarding whether an electric apparatus load is being used, and may be transmitted to the telematics server.

The calculating of the estimated fuel efficiency and the estimated available driving distance of the target vehicle may include: compensating for the fuel efficiency and the available driving distance of the vehicle traveling in each of the sections of the road from the departure point to the destination, by updating the vehicle condition information of the target vehicle, the meteorological information and the road traffic situation information on a preset cycle.

In the receiving of the real time meteorological information and the road traffic situation information, before the meteorological information and the road traffic situation information are received, average values of meteorological information and road traffic situation information that are pre-stored in the memory of telematics server may be used. In the calculating of the fuel efficiency, when the number of initial fuel efficiency data for each of the sections is less than a preset number of data, initial set data, data of a section adjacent to the corresponding section, or combination data of the corresponding section and the adjacent section may be used. The method may further include, after calculating the available driving distance, displaying, by a telematics terminal of the vehicle, the calculated available driving distance on a map as an available driving range. Accordingly, the driver is able to more accurately determine whether a destination is capable of being reached with the available driving range.

According to another aspect, a system for estimating an available driving distance of an electric vehicle using a telematics system in which a telematics terminal of the electric vehicle and a telematics server are interlocked with each other may include: a telematics server configured to divide a road into a plurality of sections, receive driving information from an arbitrary vehicle traveling through each of the sections, and generate fuel efficiency data of the corresponding section; a route searching unit (e.g., a global positioning system (GPS) or navigation system) configured to search for the fuel efficiency data stored in the database for the sections included in the road toward a destination set in a telematics terminal of a target vehicle; a communication unit configured to receive vehicle condition information, and departure point and destination information transmitted from the target vehicle, and receive real time meteorological information and road traffic situation information for each of the sections of the road from the departure point to the destination; and a calculation unit configured to reflect the vehicle condition information of the target vehicle, the meteorological information and the road traffic situation information received from the communication unit, in the fuel efficiency data generated for each of the sections of the road from the departure point to the destination, and calculate estimated fuel efficiency and an estimated available driving distance of the target vehicle. The calculation unit and the communication unit may each be operated by a controller within the vehicle.

The driving information of each of the arbitrary vehicles input to the database may include a battery consumption rate at which the vehicle consumes a battery while traveling through the corresponding section, an ambient temperature when the vehicle drives through the corresponding section, a section average driving speed, information regarding whether an eco-mode is engaged, information regarding whether headlamps are turned on, and information regarding whether wipers are turned on. The vehicle condition information transmitted from the target vehicle may include a battery condition information of the target vehicle and information regarding whether an electric apparatus load is being used, and may be transmitted to the telematics server.

In the calculation of the estimated fuel efficiency and the estimated available driving distance of the target vehicle, the fuel efficiency and the available driving distance of the vehicle traveling in each of the sections of the road from the departure point to the destination may be compensated for by updating the vehicle condition information of the target vehicle, the meteorological information and the road traffic situation information on a preset cycle. Before the meteorological information and the road traffic situation information are received, average values of meteorological information and road traffic situation information pre-stored in a memory of the telematics server may be used.

When the calculation unit calculates the fuel efficiency at an initial stage and the number of initial fuel efficiency data for each of the sections is less than a preset number of data, initial set data, data of a section adjacent to the corresponding section, or combination data of the corresponding section and the adjacent section may be used. The available driving distance calculated by the calculation unit may be displayed and provided to a driver on a map as an available driving range by the telematics terminal of the target vehicle.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
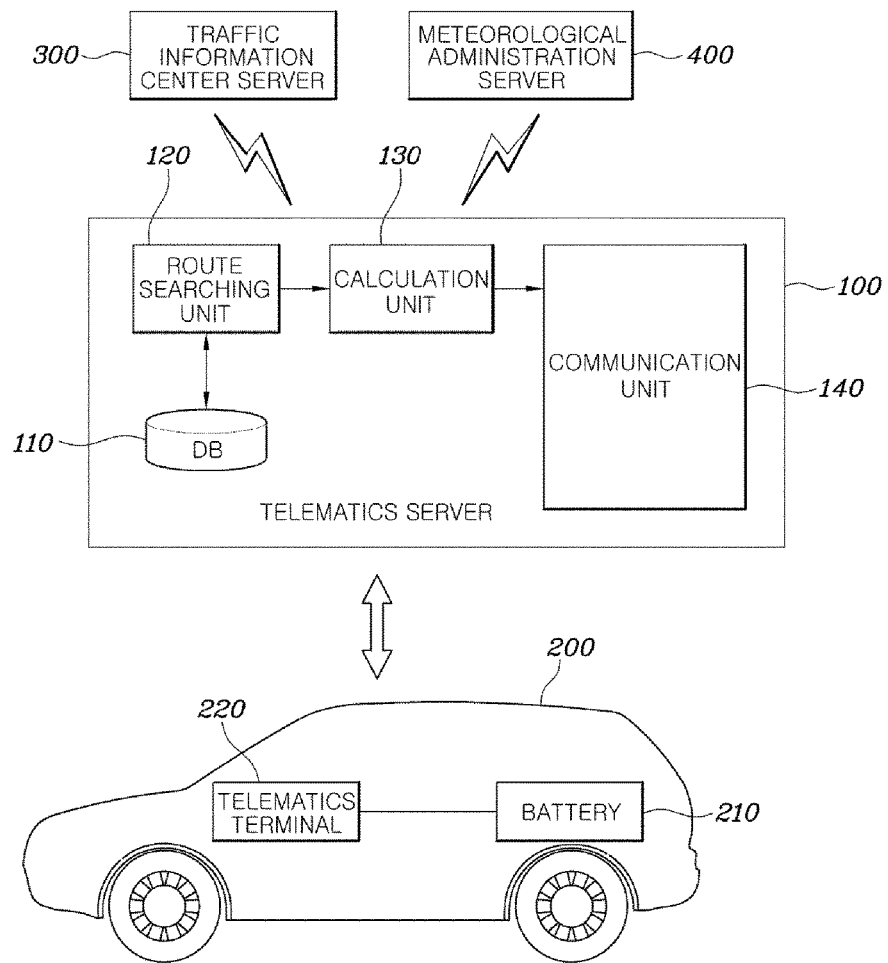
FIG. 1 is a view schematically showing the configuration of a system for estimating an available driving distance of an electric vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will now be described in detail based on aspects (or embodiments). The present invention may, however, be embodied in many different forms and should not be construed as being limited to only the exemplary embodiments set forth herein, but should be construed as covering modifications, equivalents or alternatives falling within ideas and technical scopes of the present invention.

In the following description of the present invention, detailed descriptions of known functions and components incorporated herein will be omitted when it may make the subject matter of the present invention unclear. It is also noted that, although ordinal numbers (for example, first, second, etc.) are used in the following description, they are used only to distinguish similar components. Further, in this specification, when referral to as one component "is connected to" or "is accessed to" the other component, it may be understood that the one component is connected directly to the other components, but, as long as any particular descriptions to the contrary are not made, it should be understood that the one component may be connected or accessed to the other component via another component in the middle thereof.

Hereinafter, exemplary embodiments of the present invention will be described in detail with reference to the attached drawings FIG. 1 is a view schematically showing the configuration of a system for estimating an available driving distance of an electric vehicle according to an exemplary embodiment of the present invention. As shown in FIG. 1, the system for estimating the available driving distance of the electric vehicle according to the exemplary embodiment of the present invention may include a telematics server 100 which is based on position information, an electric vehicle 200, a traffic information center server 300, and a meteorological administration server 400.

The electric vehicle 200 may be operated using the power of a battery 210. Since the fuel efficiency of the electric vehicle 200 depends on conditions of the battery 210, there is the need for a more accurate estimation of fuel efficiency. The conditions of the battery 210 of the electric vehicle 200 may be detected and vehicle information may be transmitted to the telematics server 100 via a telematics terminal 220 (e.g., a communication bus) of the vehicle 200.

In particular, the telematics terminal 220 of the vehicle 200 may be configured to transmit the vehicle information including information regarding the conditions of the battery 210 of the vehicle 200, driving information, environment information, etc. to the telematics server 100. In other words, when a destination is set through the telematics terminal 220 of the vehicle 200, the information regarding the vehicle may be transmitted to the telematics server 100. The telematics terminal 220 may be configured to detect the conditions of the battery 210 of the vehicle 200 (e.g., by communication with various vehicle sensors) and transmit the remaining capacity of the battery 210, and simultaneously transmit the environment information or the like that is a variable affecting the conditions of the battery 210, and receive information regarding an estimated available driving distance for the destination based on the remaining capacity of the battery 210.

The traffic information center server 300 is interlocked with (e.g., in communication with) the telematics server 100 and thus may be configured to transmit road traffic situation information including information regarding traffic situations of a current driving section of the vehicle 200 and information regarding a section average driving speed to the telematics server 100 (e.g., via controller area network (CAN) communication). The meteorological administration server 400 is interlocked with the telematics server 100 and thus may be configured to transmit, in real time, meteorological information including information regarding a current ambient temperature, and rain or snow to the telematics server 100.

Generally, the telematics server 100 includes a communication unit 140 configured to communicate using a combination of a mobile communication method, a position tracking method and the Internet. The telematics server 100 may be configured to operate the vehicle 200 using radio communication between the vehicle 200 and a separate server (e.g., a vehicle controller), and may be configured to execute operations using a combination with a CAN communication which interlocks components of the vehicle 200 with each other.

The telematics server 100 may be a system, which combines the telematics terminal of the vehicle 200 with the mobile communication method, the position tracking method and the Internet to detect a vehicle collision or vehicle theft, provide guidance regarding a vehicle driving route, and provide various types of other information to a driver of the vehicle 200. In other words, the telematics system for vehicles is a system configured to provide information regarding the vehicle 200 based on the mobile communication and a global positioning system (GPS) using GPS satellites. Therefore, using the GPS, a radio communication network, and the Internet, the telematics system for vehicles may provide various types of mobile communication services, such as traffic information, an emergency response procedure, remote vehicle diagnosis, use of the Internet (e.g., a financial trade, providing news, and transmitting or receiving an e-mail) to the driver of the vehicle.

Furthermore, the telematics server 100 may be configured to generate a database (DB) 110 (e.g., in a memory of the telematics server 100) regarding roads and provide road information at the same time. The telematics server 100 according to the exemplary embodiment of the present invention may include the communication unit 140 configured to exchange, via a telematics service center, data between the database 110, a route searching unit 120 and a calculation unit, and the electric vehicle 200, the traffic information center server 300 and the meteorological administration server 400.

The database 110 defines the roads by units of predetermined sections. For the defined sections, the database 110 may be configured to receive road data and battery consumption information of vehicles that are traveling in the defined sections, and generate data regarding battery consumption for each section and stores the data in the database. In particular, each road stored in the database 110 may be defined by predetermined sections. In each road for the defined sections, node serial numbers may be set based on an intersection of the road. The defined sections may be stored as link units or administration units based on the form or type of each road.

With respect to link units stored in the database 110, each of the links which have comparatively long road lengths may be defined by sequentially arranging a start node number and an end node number and may be stored in the database. A method of designating each intersection of the road as a node serial number, and storing data regarding a road between nodes into a database in the form of a link will be described herein below. For example, when the start node number is designated as 'A111' and the end node number is designated as 'B222', the name of the corresponding link may be designated as 'A111B222'.

Furthermore, with regard to the administration units stored in the database 110, links each of which has a comparatively short road length may be integrally stored on an administration basis, not on a link basis, thus reducing memory consumption. Accordingly, different storage methods based on the types of roads may be used.

The following Table 1 shows different storage methods based on the road types. Depending on the forms or type of roads, roads to be stored on a link basis may include an expressway, an urban expressway, a national highway, a government-aided provincial road and a provincial road which are comparatively long, and roads which are stored on an administration basis may include a road which is comparatively short, and a narrow road.

TABLE 1

| | Road type | Speed limit (km/h) | DB storage method |
|---|---|---|---|
| 1 | Expressway | 100 | Storage on link basis |
| 2 | Urban expressway | 80 | Storage on link basis |
| 3 | National highway | 70 | Storage on link basis |
| 4 | Government-aided provincial road | 70 | Storage on link basis |
| 5 | Provincial road | 60 | Storage on link basis |
| 6 | Major road 1 | 60 | Integrated storage on administration basis (city/borough/district) |
| 7 | Major road 2 | 50 | Integrated storage on administration basis (city/borough/district) |
| 8 | Major road 3 | 40 | Integrated storage on administration basis (city/borough/district) |
| 9 | Other road 1 | 30 | Integrated storage on administration basis (city/borough/district) |
| 10 | Other road 2 | 15 | Integrated storage on administration basis (city/borough/district) |
| 11 | Narrow road | 15 | Integrated storage on administration basis (city/borough/district) |

Figure 2:
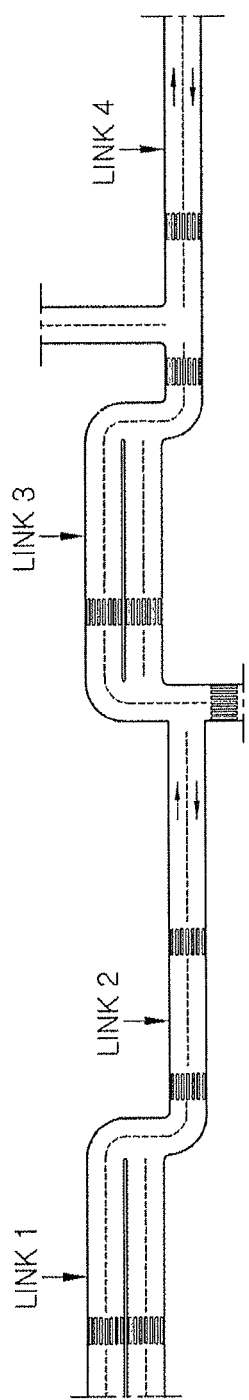
FIG. 2 is a view showing sections of a road defined on a link basis according to an exemplary embodiment of the present invention.

FIG. 2 is a view showing sections of a road defined on a link basis according to the present invention. As shown in FIG. 2, battery consumption information of each vehicle traveling on each defined section stored in the database may be transmitted in real time from the telematics terminal of each vehicle to the telematics server.

In other words, the telematics server may be configured to define each road, and receive, in real time, information regarding a battery consumption rate, at which an arbitrary electric vehicle traveling on the defined road consumes the battery through a corresponding section, and environment information of the corresponding section, from the telematics terminal of the vehicle. The battery consumption rate of each vehicle traveling through the defined section depends on battery power consumed for a motor load of the vehicle, an air conditioning load, and an electric apparatus load, current conditions of the battery, the ambient temperature of the corresponding section, a section average driving speed, information regarding whether an eco-mode is engaged, information regarding whether headlamps are turned on, and information regarding whether wipers are turned on. In addition, the battery consumption rate may also depend on other variables that influence the conditions of the battery of the vehicle.

In particular, a database for all information regarding vehicles traveling on the defined road may be generated. Further, fuel efficiencies of the vehicles traveling on the defined road may be calculated in consideration of driving loads, electric apparatus loads and air conditioning loads, and an average value in a corresponding section may be calculated and stored in the database. Therefore, as the number of vehicles traveling on the defined road increases, the accuracy of data may increase. Among the environment information of the vehicles traveling on the corresponding section, meteorological information and road traffic situation information may be respectively received in real time from the meteorological administration server and the traffic information center server via the telematics server, and sequentially stored along with the position information of the database under the serial number list of the corresponding road, thus forming a substantial database.

The route searching unit 120 (e.g., a vehicle navigation system) may be configured to search for road data and battery consumption data stored in the database 110, for the defined sections corresponding to the destination set via the telematics terminal 220 of the vehicle 200. Particularly, the road data and the battery consumption data may be searched for in each section toward the destination and then may be provided on a map or on a display for example. The calculation unit 130 may be configured to reflect driving vehicle information transmitted via the telematics terminal 220 of the traveling vehicle, in the searched road data and battery consumption data, and may be configured to calculate estimation fuel efficiency in each section toward the destination to provide an available driving distance to the driver.

In addition, the calculation unit 130 may be configured to reflect the environment information of the traveling vehicle, in the data regarding the corresponding section constructed in the database 110, and calculate driving fuel efficiency. In each corresponding section to the destination, the fuel efficiency may vary based on surrounding environment, the vehicle driving speed, the ambient temperature, use of the electric apparatuses of the vehicle 200, etc. For example, in the section of link 1, the vehicle driving speed may be about 30 km/h due to a heavy traffic jam, and in the section link 2, the vehicle driving speed may be about 50 km/h. In addition, the ambient temperature in the section of link 1 may be about 25° C., and in the section of link 2, the ambient temperature may be about 24° C., the headlamps may be turned-on, and the wipers may be turned-off. Accordingly, under different conditions, the battery consumption rate may change. Therefore, taking such variables into account, more accurate values must be obtained and reflected.

In receiving vehicle information from the vehicle with respect to the corresponding section through which the vehicle is traveling, the ambient temperature and the average vehicle speed may be respectively received from the meteorological administration server 400 and the traffic information center server 300 and reflected in calculation of fuel efficiency. In this regard, the calculation unit 130 may be configured to calculate the available driving distance of the traveling vehicle, using the calculated driving fuel efficiency, in consideration of the remaining battery capacity of the vehicle, and provide the available driving distance. Furthermore, in calculating the fuel efficiency of the driving vehicle toward the destination, the calculation unit 130 may be configured to update, in real time, information regarding a predetermined cycle and compensates for it to provide more accurate information.

Figure 3A:
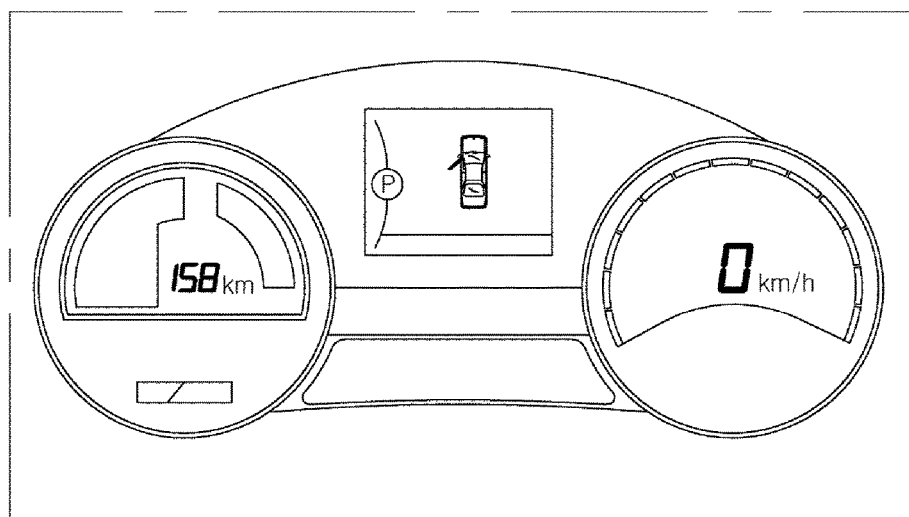
FIGS. 3A and 3B are views showing the available driving distance displayed on a cluster and a navigation system of the vehicle according to an exemplary embodiment of the present invention.
Figure 3B:
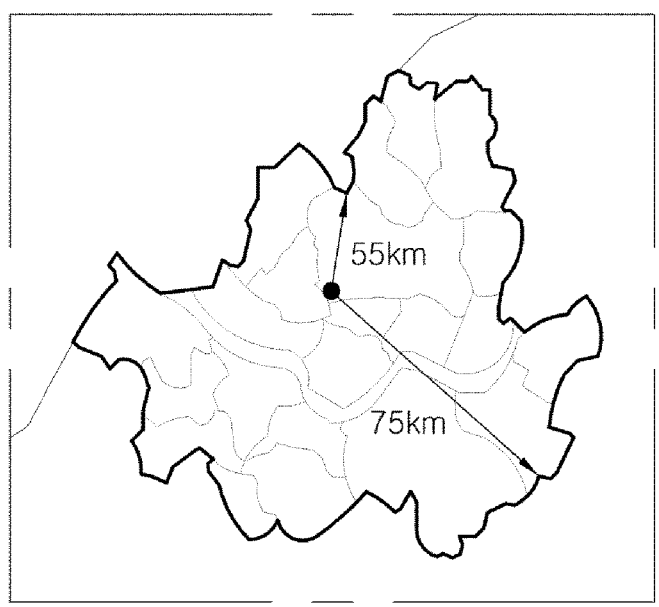

FIGS. 3A and 3B are views showing the available driving distance displayed on a cluster and a navigation system of the vehicle according to the present invention. As shown in FIGS. 3A and 3B, when a route is set using the navigation system, the cluster of the vehicle may be configured to display an available driving distance calculated using road data of each corresponding section generated in the database. Furthermore, the navigation system may be configured to display an available driving range on a map in the form of a range for the driver to intuitively recognize the information. In this regard, end points of available driving distances of links of which data is secured may be connected to each other and displayed on the navigation map. When a data-based available driving distance calculation is used, a difference in energy consumption is shown based on the direction and position in calculation by links.

Figure 4:
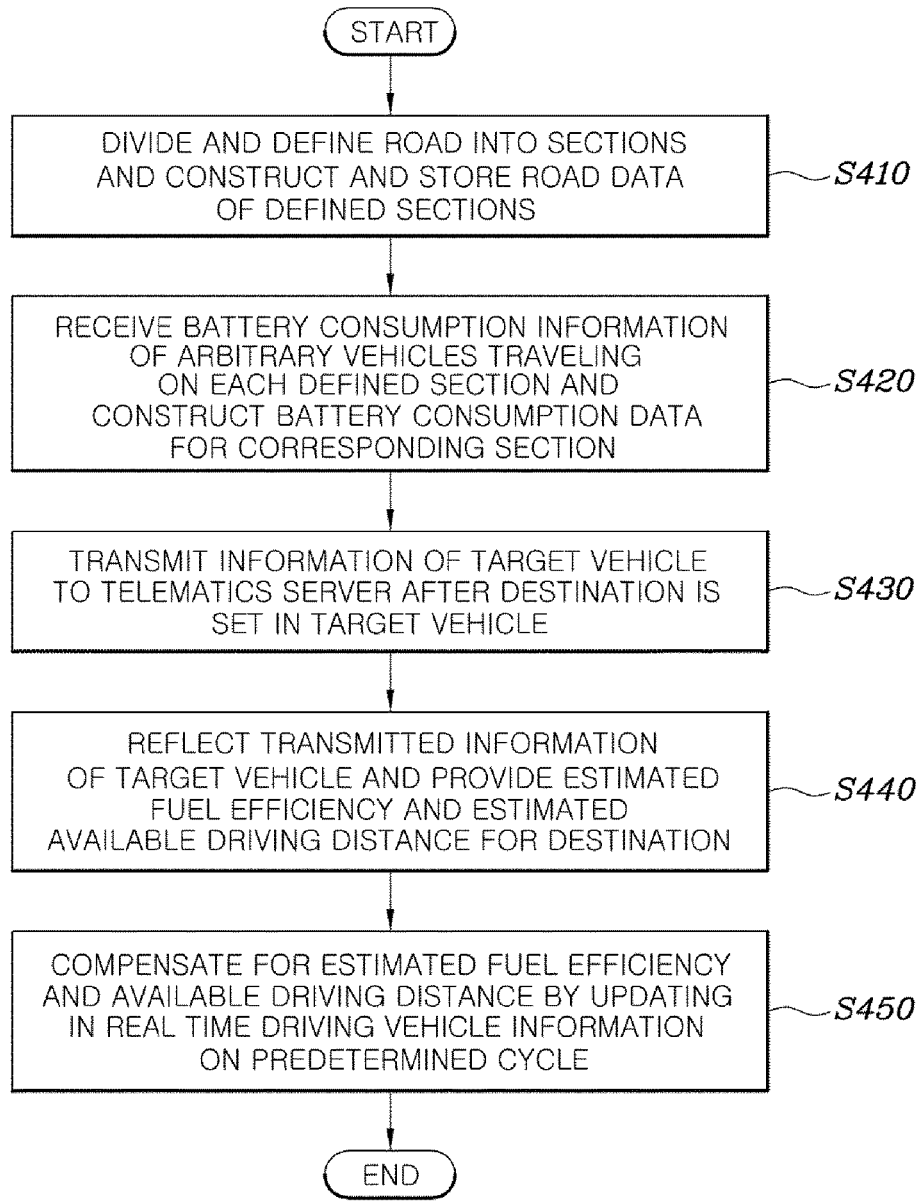
FIG. 4 is a flowchart showing a method of estimating the available driving distance of the electric vehicle according to an exemplary embodiment of the present invention.

FIG. 4 is a flowchart showing a method of estimating the available driving distance of the electric vehicle according to an exemplary embodiment of the present invention. As shown in FIG. 4, in the method of estimating the available driving distance of the electric vehicle according to the exemplary embodiment of the present invention, a road may be divided and defined into a plurality of sections, and data may be generated for the defined sections and stored in the database of the server (at S410).

In particular, the road stored in the database 110 may be defined by sections according to the type of road. In the road for the defined sections, node serial numbers may be set based on an intersection of the road. The defined sections may be stored on a link basis or an administration basis depending on the form or type of the road. With respect to link units stored in the database 110, a comparatively long road may be sectioned by link units, and each link unit may be defined by sequentially arranging a start node number and an end node number and may be stored in the database. In other words, this is a method of designating each intersection of the road as a node serial number, and storing data regarding a road between nodes into a database in the form of a link. For example, when the start node number is designated as 'A111' and the end node number is designated as 'B222', the name of the corresponding link may be designated as 'A111B222'. Furthermore, with regard to the administration units stored in the database 110, links each of which has a comparatively short road length may be integrally stored on an administration basis, not on a link basis to thus reduce memory consumption. Accordingly, different storage methods based on the types of roads may be used.

When fuel efficiency data stored in the database at an initial stage is insufficient, an available driving distance may be provided using a CAL value, an adjacent link value, a blending value, etc. at the initial stage based on the number of stored data. In other words, when the number of initial fuel efficiency data by sections is less than a preset number of data, initial set data, data of a section adjacent to the corresponding section, or combination data of the corresponding section and the adjacent section may be used. For example, at the initial stage in which the number of accumulated data is 0 to 10 or 10 to 20, since the number of data samples is insufficient, an initial CAL value and a calculated value of the adjacent link may be used. When the number of accumulated data is 20 to 30, data of the corresponding link and data of the adjacent link may be blended or combined. The system may be set such that, when the number of data samples is 30 or greater, the data of only the corresponding link is used.

Thereafter, driving information of the vehicles traveling through the defined section may be received, and fuel efficiency data for the corresponding section may be generated and stored in the database of the telematics server (at S420). In particular, the telematics server may be configured to define each road, and receive, in real time, information regarding a battery consumption rate, at which an arbitrary electric vehicle traveling on the defined road consumes the battery in a corresponding section, and environment information of the corresponding section, from the telematics terminal of the vehicle. Accordingly, the battery consumption rate of each vehicle driving through the defined section depends on battery power consumed for a motor load of the vehicle, an air conditioning load, and an electric apparatus load, current conditions of the battery, the ambient temperature of the corresponding section, a section average driving speed, information regarding whether an eco-mode is engaged, information regarding whether headlamps are turned on, and information regarding whether wipers are turned on. In addition, the battery consumption rate may also depend on other variables that influence the conditions of the battery of the vehicle.

Particularly, a database for all information regarding vehicles traveling on the defined road may be generated. The fuel efficiencies of the vehicles traveling on the defined road may be calculated in consideration of driving loads, electric apparatus loads and air conditioning loads, and an average value in a corresponding section is calculated and stored in the database. Therefore, as the number of vehicles traveling on the defined road increases, the accuracy of data increases.

Furthermore, among the environment information of the vehicles traveling on the corresponding section, meteorological information and road traffic situation information may be respectively received in real time from the meteorological administration server and the traffic information center server via the telematics server, and sequentially stored along with the position information of the database under the serial number list of the corresponding road, thus forming a substantial amount of data. Subsequently, when a destination is set via the telematics terminal 220 of the vehicle, condition information of the vehicle and environment information for each corresponding section toward the destination may be transmitted to the telematics server (at S430).

In addition, information regarding the conditions of the battery 210 of the vehicle, driving information, driving environment information, etc. may be transmitted to the telematics server. In other words, when the destination is set via the telematics terminal 220 of the vehicle, the information regarding the vehicle may be transmitted to the telematics server. In this regard, the telematics terminal 220 may be configured to detect the conditions of the battery 210 of the vehicle and transmit the remaining capacity of the battery 210, and simultaneously transmit the environment information or the like that is a variable affecting the conditions of the battery 210, and receive information regarding an estimated available driving distance for the destination based on the remaining capacity of the battery 210.

The traffic information center server 300 is interlocked with the telematics server 100 and thus may be configured to transmit road traffic situation information including information regarding traffic situations of a current driving section of the vehicle and information regarding a section average driving speed to the telematics server 100. The meteorological administration server 400 is interlocked with the telematics server 100 and thus may be configured to transmit, in real time, meteorological information including information regarding a current ambient temperature and regarding whether rain or snow is detected to the telematics server 100.

Thereafter, the condition information of the vehicle and the environment information for each corresponding section toward the destination may be reflected in the fuel efficiency data of the corresponding section toward the destination stored in the database, and estimated fuel efficiency and available driving distance for the corresponding section may be calculated and then provided to a driver of the vehicle (at S440). In particular, first, road data and battery consumption data stored in the database 110 may be searched for the defined sections corresponding toward the destination set via the telematics terminal 220 of the vehicle. The road data and the battery consumption data may be searched for in each section toward the destination and then may be provided to the driver.

The calculation unit 130 may be configured to reflect driving vehicle information transmitted via the telematics terminal 220 of the vehicle, in the searched road data and battery consumption data, and calculate estimation fuel efficiency in each section toward the destination to provide an available driving distance. In particular, the calculation unit 130 may be configured to reflect the environment information of the vehicle, in the data regarding the corresponding section built in the database 110, and may be configured to calculate driving fuel efficiency. In each corresponding section toward the destination, the fuel efficiency may vary based on surrounding environment, the vehicle driving speed, the ambient temperature, use of the electric apparatuses of the vehicle 200, etc.

For example, in the section of link 1, the vehicle driving speed may be about 30 km/h due to a heavy traffic jam, and in the section link 2, the vehicle driving speed may be about 50 km/h. In addition, the ambient temperature in the section of link 1 may be about 25° C., and in the section of link 2, the ambient temperature may be about 24° C., the headlamps may be turned-on, and the wipers may be turned-off. Accordingly, under different conditions, the battery consumption rate may change. Therefore, taking variables into account, more accurate values must be obtained and reflected.

In receiving vehicle information from the vehicle with respect to the corresponding section through which the vehicle is traveling, the ambient temperature and the average vehicle speed may be respectively received from the meteorological administration server 400 and the traffic information center server 300 and reflected in calculation of fuel efficiency. Before the meteorological information and the road traffic situation information are received, an average value of meteorological information of the same time period and the same section stored in the telematics server, and an average value of road traffic situation information of the same time period and the same section may be used while data is received.

The calculation unit 130 may be configured to calculate the available driving distance of the vehicle, using the calculated driving fuel efficiency, in consideration of the remaining battery capacity of the vehicle. For instance, when an available driving distance is estimated when the vehicle moves from Namyang to Jukjeon (e.g., a first city to a second city), data regarding an ambient temperature and an average vehicle speed, which is variable information required for the estimation, may be calculated using information corresponding to actual driving time period. The corresponding road may be divided into corresponding link sections, for example, section 1 from Namyang Research Institute to Bibong IC, section 2 from Bibong IC to Gunpo IC, section 3 from Gunpo IC to Dongsuwon IC, section 4 Donsuwon IC to Jukjeon Station.

Further, an ambient temperature and an average vehicle speed obtained at the same time period as a start time of the section 1 may be used. An ambient temperature and an average vehicle speed of the section 2 obtained at the same time period as that after twenty minutes from the start time may be used. In addition, an ambient temperature and an average vehicle speed of the section 3 obtained at the same time period as that after thirty minutes from the start time may be used (e.g., rain prediction after thirty minutes: reflecting rain data). An ambient temperature and an average vehicle speed of the section 4 obtained at the same time period as that after forty-five minutes from the start time may be used (e.g., the vehicle enters a congested section after forty-five minutes, the average vehicle speed is reduced).

The fuel efficiency may be calculated using a battery consumption rate obtained using the determined ambient temperature and average vehicle speed that are variable data, whereby the available driving distance may be more accurately estimated and provided to the vehicle driver. The fuel efficiency and available driving distance of the driving vehicle for each corresponding section toward the destination may be compensated for by updating in real time the current condition information of the vehicle and the environment information on a predetermined cycle (e.g., updated every, for example, 10 minutes) (at S450). When the fuel efficiency for each section is estimated in the telematics server, since a time difference is present between when estimating and when driving, variable information obtained when estimating and variable data values obtained when traveling may differ from each other. Therefore, when the vehicle is driven after an initial estimation operation has been performed, the variable information may be compensated for as time elapses, whereby the accuracy may be enhanced. In this regard, an interval of a cycle for updating the information may be about 10 minutes, but it is not limited to this, and the updating interval may be changed as needed.

According to the present invention, data reflecting road conditions and real driving data of electric vehicles may be generated, and, based on the data, an available driving distance may be more accurately estimated and provided to a driver taking into account the remaining capacity of a battery of an electric vehicle that is traveling.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of estimating an available driving distance of an electric vehicle, comprising:
dividing, by a telematics server, a road into a plurality of sections;
receiving, by the telematics server, driving information from an arbitrary vehicle traveling through each of the sections;
generating, by the telematics server, fuel efficiency data of the corresponding section based on the driving information;
receiving, by the telematics server, vehicle condition information, and departure point and destination information from a target vehicle;

receiving, by the telematics server, real time meteorological information and road traffic situation information for each of the sections of the road from the departure point to the destination;

reflecting, by the telematics server, the vehicle condition information of the target vehicle, the meteorological information and the road traffic situation information in the fuel efficiency data generated for each of the sections of the road from the departure point to the destination; and calculating, by the telematics server, estimated fuel efficiency and an estimated available driving distance of the target vehicle, wherein the driving information received from each arbitrary vehicle traveling through the sections includes: a battery consumption rate at which a battery of the arbitrary vehicle is consumed while traveling through the corresponding section, an ambient temperature when the arbitrary vehicle drives through the corresponding section, an average driving speed in the corresponding section, information indicating whether an eco-mode of the arbitrary vehicle is engaged, information indicating whether headlamps of the arbitrary vehicle are turned on, and information indicating whether wipers of the arbitrary vehicle are turned on.

2. The method according to claim 1, wherein the vehicle condition information transmitted from the target vehicle includes a battery condition information of the target vehicle and information regarding whether an electric apparatus load is being used, and is transmitted to the telematics server.

3. The method according to claim 1, wherein the calculating of the estimated fuel efficiency and the estimated available driving distance of the target vehicle comprises:

compensating for the fuel efficiency and the available driving distance of the vehicle traveling in each of the sections of the road from the departure point to the destination, by updating the vehicle condition information of the target vehicle, the meteorological information and the road traffic situation information on a preset cycle.

4. The method according to claim 1, wherein in the receiving of the real time meteorological information and the road traffic situation information, before the meteorological information and the road traffic situation information are received, average values of meteorological information and road traffic situation information pre-stored in the telematics server are used.

5. The method according to claim 1, wherein in the calculating of the fuel efficiency, when the number of initial fuel efficiency data for each of the sections is less than a preset number of data, initial set data, data of a section adjacent to the corresponding section, or combination data of the corresponding section and the adjacent section is used.

6. The method according to claim 1, further comprising: after the calculating of the available driving distance, displaying, by a telematics terminal of the vehicle, the calculated available driving distance on a map as an available driving range.

7. A system for estimating an available driving distance of an electric vehicle using a telematics system in which a telematics terminal of the electric vehicle and a telematics server are interlocked with each other, the system comprising:

a telematics server configured to divide a road into a plurality of sections, receive driving information from an arbitrary vehicle traveling through each of the sections, and generate fuel efficiency data of the corresponding section based on the driving information;

a route searching unit configured to search for the fuel efficiency data stored in a database for the sections of the road toward a destination set in a telematics terminal of a target vehicle;

a communication unit configured to receive vehicle condition information, and departure point and destination information that are transmitted from the target vehicle, and receive real time meteorological information and road traffic situation information for each of the sections of the road from the departure point toward the destination; and a calculation unit configured to reflect the vehicle condition information of the target vehicle, the meteorological information and the road traffic situation information received from the communication unit, in the fuel efficiency data generated for each of the sections of the road from the departure point toward the destination, and calculate estimated fuel efficiency and an estimated available driving distance of the target vehicle, wherein the driving information received from each arbitrary vehicle traveling through the sections includes: a battery consumption rate at which a battery of the arbitrary vehicle is consumed while traveling through the corresponding section, an ambient temperature when the arbitrary vehicle drives through the corresponding section, an average driving speed in the corresponding section, information indicating whether an eco-mode of the arbitrary vehicle is engaged, information indicating whether headlamps of the arbitrary vehicle are turned on, and information indicating whether wipers of the arbitrary vehicle are turned on.

8. The system according to claim 7, wherein the vehicle condition information transmitted from the target vehicle includes a battery condition information of the target vehicle and information regarding whether an electric apparatus load is being used, and is transmitted to the telematics server.

9. The system according to claim 7, wherein in the calculation of the estimated fuel efficiency and the estimated available driving distance of the target vehicle, the fuel efficiency and the available driving distance of the vehicle traveling in each of the sections of the road from the departure point to the destination is compensated for by updating the vehicle condition information of the target vehicle, the meteorological information and the road traffic situation information on a preset cycle.

10. The system according to claim 7, wherein before the meteorological information and the road traffic situation information are received, average values of meteorological information and road traffic situation information pre-stored in the telematics server are used.

11. The system according to claim 7, wherein when the calculation unit is configured to calculate the fuel efficiency at an initial stage, when the number of initial fuel efficiency data for each of the sections is less than a preset number of data, initial set data, data of a section adjacent to the corresponding section, or combination data of the corresponding section and the adjacent section is used.

12. The system according to claim 7, wherein the available driving distance calculated by the calculation unit is displayed and provided on a map as an available driving range by the telematics terminal of the target vehicle.

13. A non-transitory computer readable medium containing program instructions executed by a processor for estimating an available driving distance of an electric vehicle, the non-transitory computer readable medium comprising:

program instructions that divide a road into a plurality of sections, receive driving information from an arbitrary vehicle traveling through each of the sections, and generate fuel efficiency data of the corresponding section based on the driving information;

program instructions that receive vehicle condition information, and departure point and destination information from a target vehicle;

program instructions that receive real time meteorological information and road traffic situation information for each of the sections of the road from the departure point to the destination; and program instructions that reflect the vehicle condition information of the target vehicle, the meteorological information and the road traffic situation information in the fuel efficiency data generated for each of the sections of the road from the departure point to the destination, and calculate estimated fuel efficiency and an estimated available driving distance of the target vehicle, wherein the driving information received from each arbitrary vehicle traveling through the sections includes: a battery consumption rate at which a battery of the arbitrary vehicle is consumed while traveling through the corresponding section, an ambient temperature when the arbitrary vehicle drives through the corresponding section, an average driving speed in the corresponding section, information indicating whether an eco-mode of the arbitrary vehicle is engaged, information indicating whether headlamps of the arbitrary vehicle are turned on, and information indicating whether wipers of the arbitrary vehicle are turned on.

14. The non-transitory computer readable medium of claim 13, wherein the program instructions that calculate the estimated fuel efficiency and the estimated available driving distance of the target vehicle include:

program instructions that compensate for the fuel efficiency and the available driving distance of the vehicle traveling in each of the sections of the road from the departure point to the destination, by updating the vehicle condition information of the target vehicle, the meteorological information and the road traffic situation information on a preset cycle.

* * * * *